United States Patent
Sharma et al.

(10) Patent No.: US 10,474,377 B2
(45) Date of Patent: Nov. 12, 2019

(54) OPTIMIZING DATA WRITES IN A DISTRIBUTED COMPUTING SYSTEM

(71) Applicant: Facebook, Inc., Menlo Park, CA (US)

(72) Inventors: Arun Dattaram Sharma, Union City, CA (US); Manukranth Viswakarma Chary Kolloju, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 196 days.

(21) Appl. No.: 15/642,718

(22) Filed: Jul. 6, 2017

(65) Prior Publication Data

US 2019/0012100 A1    Jan. 10, 2019

(51) Int. Cl.
*G06F 3/06*     (2006.01)
*G06F 9/54*     (2006.01)
*G06F 16/23*    (2019.01)

(52) U.S. Cl.
CPC ............ *G06F 3/0619* (2013.01); *G06F 3/061* (2013.01); *G06F 3/065* (2013.01); *G06F 3/067* (2013.01); *G06F 3/0644* (2013.01); *G06F 9/54* (2013.01); *G06F 16/2322* (2019.01)

(58) Field of Classification Search
CPC .. G06F 16/2322; G06F 3/0619; G06F 3/0644; G06F 3/05; G06F 3/07; G06F 9/54; G06F 3/065; G06F 3/067; G06F 3/061
USPC ........................................................ 707/703
See application file for complete search history.

(56) References Cited

U.S. PATENT DOCUMENTS

| | | | | |
|---|---|---|---|---|
| 7,761,421 B2 * | 7/2010 | Frolund | .............. | G06F 11/1662 707/637 |
| 8,725,684 B1 * | 5/2014 | Wang | .................... | G06F 16/275 707/613 |
| 9,699,017 B1 * | 7/2017 | Gupta | ................. | H04L 67/1095 |
| 9,785,510 B1 * | 10/2017 | Madhavarapu | ..... | G06F 11/1446 |
| 10,216,949 B1 * | 2/2019 | McKelvie | ........... | G06F 21/6227 |
| 10,223,184 B1 * | 3/2019 | McKelvie | ............... | G06F 11/14 |
| 2007/0282915 A1 * | 12/2007 | Vosshall | .............. | G06F 16/2365 |

(Continued)

OTHER PUBLICATIONS

Corbett, James C., et al., "Spanner: Google's Globally Distributed Database", ACM Transactions on Computer Systems, vol. 31, No. 3, Article 8, Aug. 2013, 22 pages.*

(Continued)

*Primary Examiner* — Robert Stevens
(74) *Attorney, Agent, or Firm* — FisherBroyles, LLP

(57) ABSTRACT

The disclosure is directed to optimizing data writes in a distributed computing system, e.g., a social networking application. The system employs a write-ahead log (WAL) and a hybrid logical clock (HLC) together to improve data writes across data centers in the distributed computing system, including improving: (1) consensus monitoring and enforcement in replicating data across the data centers; (2) scalability of data writes, e.g., so that different data centers can together handle a sudden increase in data writes during specified periods and consistently maintain the time ordering of the data writes; (3) replication configuration of data centers so that client devices can specify a replication hierarchy per transaction, e.g., at the time of writing the data, rather than specifying at data center configuration time; and (4) a draining process to write transactions committed to the WAL to data storage systems in the data centers.

20 Claims, 7 Drawing Sheets

(56) References Cited

U.S. PATENT DOCUMENTS

| | | | |
|---|---|---|---|
| 2011/0246826 A1* | 10/2011 | Hsieh | G06F 11/3476 |
| | | | 714/20 |
| 2012/0011398 A1* | 1/2012 | Eckhardt | G06F 11/2028 |
| | | | 714/15 |
| 2014/0195486 A1* | 7/2014 | Kulkarni | G06F 16/275 |
| | | | 707/627 |
| 2015/0026128 A1* | 1/2015 | Drobychev | G06F 16/23 |
| | | | 707/634 |
| 2018/0260428 A1* | 9/2018 | Patel | G06F 9/45558 |

OTHER PUBLICATIONS

Baker, Jason, et al., "Megastore: Providing Scalable, Highly Available Storage for Interactive Services", CIDR '11, Asilomar, CA, Jan. 9-12, 2011, pp. 223-234.*

Bravo, Manuel, et al., "On the use of Clocks to Enforce Consistency in the Cloud", Bulletin of the IEEE Computer Society Technical Committee on Data Engineering, © 2015 IEEE, pp. 18-31.*

Song, Weijia, et al., "The Freeze-Frame File System", SoCC '16, Santa Clara, Ca, Oct. 5-7, 2016, pp. 307-320.*

Demirbas, Murat, et al., "Highly Auditable Distributed Systems", HotCloud '15, Santa Clara, Ca, Jul. 6-7, 2015, 6 pages.*

\* cited by examiner

OPTIMIZING DATA WRITES IN A DISTRIBUTED COMPUTING SYSTEM

BACKGROUND

Some social networking platforms have many millions of users and manage a significant amount of data associated with the users. To manage the data efficiently, the social networking platforms use some data partitioning services, which creates data partitions ("shards"). The data is stored as multiple shards in which each shard stores a subset of the data. At least some of the current social networking platforms do not optimize data writes, e.g., writing data to the social networking platform and/or replicating data from one computing system to another computing system. They may not guarantee a causal ordering of the data written into the social networking platform, e.g., in the presence of a clock skew among systems that generate the data to be stored in the social networking platform. For example, consider that a first user of the social networking platform posted a photo, and a second user of the social networking platform posted a comment against that photo, and typically the photo should have an earlier timestamp than the comment (e.g., causally ordered), but with the clock skew of computing systems that write the photo and comment, it's possible that the photo has a later timestamp than the comment, and therefore, the photo and the comment can be written to the social networking platform out of order (e.g., not causally ordered). In some social networking systems, the clock skew is even more evident when data is written from components of the social networking system that are distributed across geographical regions (e.g., and the communication links between them may have a high latency).

Some social networking platforms do not provide scalability or configurability for data writes. For example, consider that an event is being hosted for a celebrity user on the social networking platform. A significant number of users may post comments on a celebrity page in the social networking platform in a very short period of time. The current social networking platforms are not efficient in handling a sudden increase in the number of writes, thereby increasing the write latency, which deteriorates the user experience. Also, some of the current social networking platforms do not provide the flexibility for an application service to specify or choose a replication configuration per data write, that is, at the time of writing data. The application service may have to specify the replication configuration at the time of designing the application service, which can be changed later. This can be disadvantageous because if a need or objective of the application service for writing a specified data item changes, the social networking platform may not be able to fulfill that objective of the application service for writing the specified data item.

DETAILED DESCRIPTION

Figure 1:
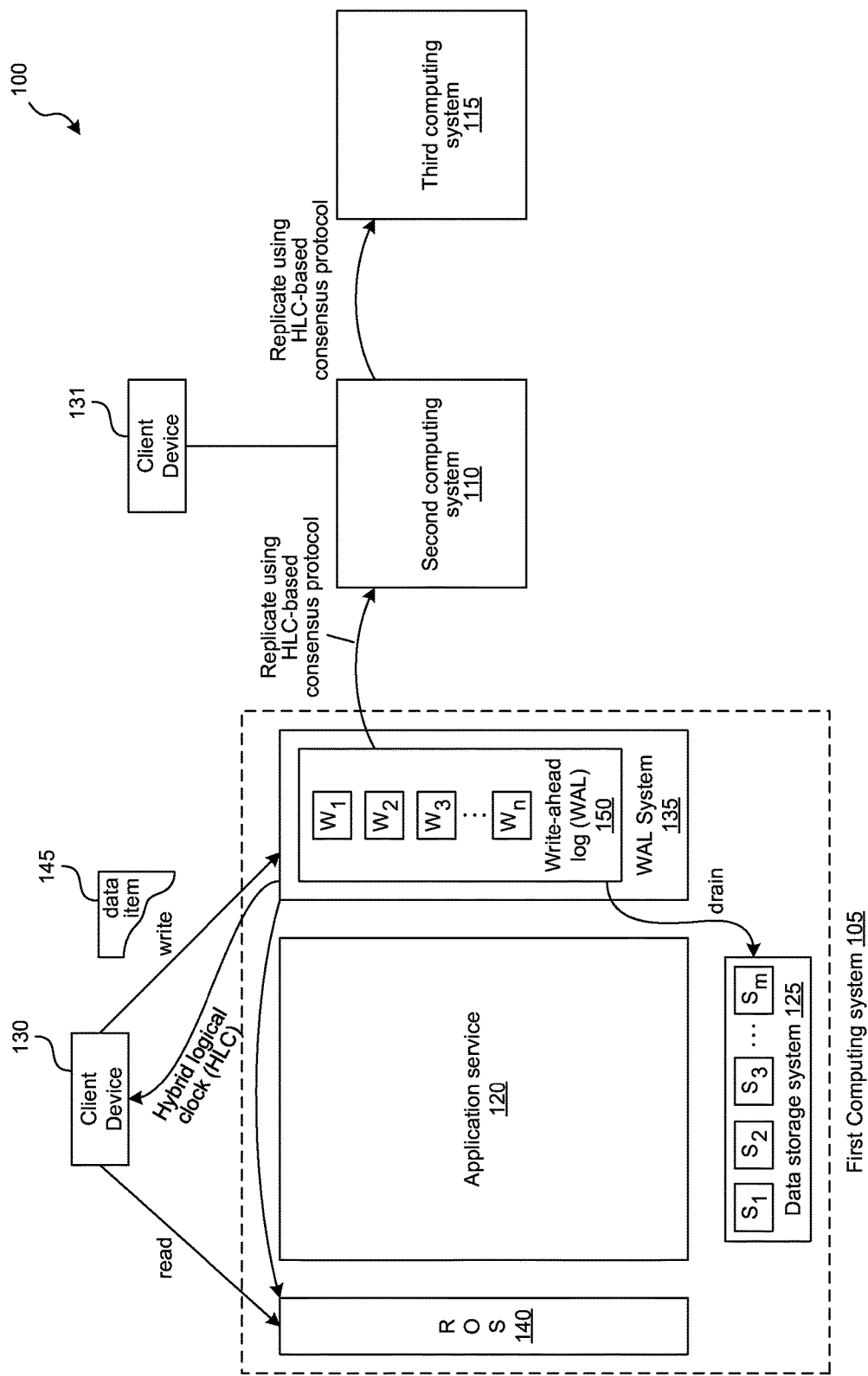
FIG. 1 is a block diagram illustrating an environment in which the disclosed embodiments can be implemented.

Embodiments are directed to optimizing data writes in a distributed computing system, e.g., a social networking application. The embodiments employ a write-ahead log (WAL) and a hybrid logical clock (HLC) together to improve data writes across data centers in the distributed computing system, including improving: (1) consensus monitoring and enforcement in replicating data across the data centers; (2) scalability of data writes, e.g., so that a data center can handle a sudden increase in data writes during specified periods and consistently maintain the time ordering of the data writes across the data centers; (3) replication configuration of data centers so that client devices that write data into the data centers can specify a replication hierarchy per transaction, e.g., at the time of writing the data, rather than at data center configuration time; and (4) a draining process to write transactions committed to the WAL to data storage systems in the data centers.

When client devices write data items to one or more data centers, the embodiments ensure causal ordering of the data writes, e.g., appropriate time ordering of the data items regardless of any clock skew among the clocks of devices that generate the data items to be stored in the distributed computing system. Further, the embodiments also ensure that the data items are replicated to one or more data centers in the distributed computing system with the appropriate time ordering. In some embodiments, a clock skew or a timing skew is a phenomenon in computer systems in which the same sourced clock signal arrives at different components at different times. For example, consider that a first user of a social networking application posted a photo, and a second user of the social networking application posted a comment against that photo, and typically the photo should arrive at the data center first and the comment later, but with the clock skew of computing systems that write the above data items, e.g., the photo and comments, it's possible that the photo has a later timestamp than the comment and therefore, the photo and the comment can be written to the data storage systems of the data centers out of order. The embodiments employ what is referred to as a HLC to maintain the ordering even in the presence of clock skew.

In some embodiments, a HLC is a logical clock which keeps close to physical time. The HLC timestamp has two components: (1) Physical time component (pt)—represents number of milliseconds since epoch and (2) Logical time component (lt)—represents the logical component of the timestamp. The HLC is bounded (that is, the physical time in an HLC timestamp will always be the current system time<=HLC physical time<=current system time+Delta) and strictly increasing. This makes causally dependent events get the right ordering of timestamps. HLC carries the time sense forward just like Physical time. HLC maintains its logical clock to be always close to the network time protocol (NTP) clock, and hence, HLC can be used in lieu of physical/NTP clock in several applications, e.g., distributed databases. Most importantly, HLC preserves the property of logical clocks, e.g., if an event e is happening before an event f, then HLC timestamp of e<HLC timestamp of f (e hb f⇒hlc.e<hlc.f) and as such HLC can identify and return consistent globally time ordered data without needing to wait out clock synchronization uncertainties and without needing prior coordination, in a posteriori fashion. HLC captures the causality relationship and ensure appropriate time ordering even in the presence of clock skew.

Continuing with the above example for writing the data items, such as a photo and a comment, when write requests are received at a data center, the embodiments write the data items to a WAL associated with the data center and assign an HLC timestamp to each of the data items to ensure appropriate time ordering, e.g., causal relationship between the data items is maintained regardless of any clock skew. The data items are then written to the data storage systems in the order of their HLC timestamps to maintain appropriate time ordering. Further, the embodiments also use the HLC timestamps of the data items in replicating the data items to other data centers. For example, embodiments configure a consensus protocol used in replicating the data items to use the HLC timestamps of the data items instead of the actual timestamps associated with the data items. The HLC-based consensus protocol ensures that the data items are replicated in an appropriate time ordering.

In some embodiments, a data item is written to the WAL using a universally unique identifier (UUID), which ensures exactly-once write semantics for the data item across datacenters in the distributed computing system. In some embodiments, data consuming systems, e.g., application services such as indexing systems or stream processing systems that consume the WAL provide consistent reads across multiple data centers. The WAL, e.g., any WAL from any of multiple datacenters in the distributed computing system, can transmit data items to a data consuming system that are sorted based on the HLC timestamps of the data items to provide a consistent read.

The embodiments also enable scaling of the data writes in the data center. In some embodiments, the WAL of the data center to which the data items are written is partitioned into multiple partitions. Similarly, a data storage system in the datacenter is partitioned into multiple shards. Data associated with an application, e.g., a social networking application, can be partitioned into shards in which each shard stores a subset of the data. For example, a first shard stores data associated with a first set of users and a second shard stores data associated with a second set of users of the social networking application. When a data item is stored at the data storage system, the data item is stored at a shard the data item is associated with. Typically, the data item includes identification (ID) of the shard with which the data item is associated. In prior systems, the partitions of the WAL and the shards of the data storage system had a one-to-one correspondence, e.g., a data item associated with a specified shard is written to a partition of the WAL that corresponds to the specified shard. However, such a configuration can cause inefficiency in writing data. For example, if the social networking application is hosting an event for a celebrity user on the social networking application then a significant number of users may post comments on the celebrity page, and writing all those comments to a single partition of the WAL that corresponds to the shard with which the celebrity user is associated can cause a bottleneck for writing the data and increase the write latency. The embodiments provide scalability to data writes by configuring the WAL to receive data writes for any shard in the data storage system at any of partitions of the WAL. That is, a client device can write a data item associated with a specified shard to any of the partitions of the WAL and not to a specified partition. The embodiments remove the one-to-one correspondence between the WAL partitions and the shards of the data storage systems. The embodiments can remove or add partitions to the WAL on demand, e.g., based on the rate at which writes are received at the WAL. Further, the number of partitions in the WAL can be less, same or more than the number of shards in the data storage system.

The embodiments also enable choosing a replication configuration per data write as opposed to defining or assigning the replication configuration at design time of the data storage system. In some embodiments, at least some of the partitions of the WAL are associated with different replication configurations, each directed to a different benefit. For example, in a first replication configuration a first partition provides no replication. The first configuration provides the least latency among other replication configurations, e.g., the time required to write the data item is minimum as no consensus is required among multiple datacenters. In a second replication configuration, a second partition of the WAL can be configured to replicate the data items written to the partition to be replicated to at least a subset of the data centers, e.g., 3 out of 5 data centers, without requirement of any consistency. The second configuration can provide data availability since the data items are replicated to more than one data center. However, the second configuration may not provide any consistency. A third partition can be configured to provide availability and consistency, e.g., replicate the data items to at least a subset of the data centers, e.g., 3 out of 5 data centers, and provide consistency by requiring a consensus among the subset of the data centers. Further, in the third configuration the latency of a data write may be higher compared to that of the first and second configuration since time is consumed for obtaining consensus.

The embodiments include a drain process that facilitates draining of the data items from the WAL to the data storage system, e.g., write the data items from the WAL to the shards of the data storage system of the data center. The drain process identifies the data items associated with a specified shard from each of the partitions of the WAL and writes them to the specified shard in the data storage system. In some embodiments, the drain process writes the data items to the specified shard in an order based on the HLC timestamps of the data items. The drain process can repeat the draining process for some or all of the shards of the data storage system. The drain process can be executed as a scheduled job, e.g., for every predefined time period, or based on any other trigger, e.g., a size of the WAL exceeding a specified threshold, or a number of data writes to the WAL exceeding a specified threshold.

Turning now to Figures, FIG. 1 is a block diagram illustrating an environment 100 in which the disclosed embodiments can be implemented. The environment 100 includes one or more computing systems 105-115, e.g., data centers, which process data requests from one or more client devices, e.g., client device 130. The data requests can include a write request for writing data to the data centers, or a read request for reading data from the data centers. The data centers 105-115 can be spread across geographical regions, e.g., continents, countries, cities, or counties. In some embodiments, the data requests from client devices from a specified geographical region are processed by a data center in the specified region. For example, data requests from the client device 130 in a first region are processed by the first datacenter 105 in the first region, and data requests from the client device 131 in a second region are processed by the second datacenter 110 in the second region. The data written to a specified data center can be replicated to one or more data centers in the environment 100.

The first data center 105 can include a data storage system 125 that is implemented as a number of shards, e.g., shards $S_1$-$S_m$. The data storage system 125 can be used to store data associated with an application, e.g., a social networking application. The data can include user profile data, messages, comments, photos of users of the social networking application. Each shard can include a subset of the data associated with the application. Each shard can be implemented on one or more host machines having a data storage medium, e.g., hard drives, solid state drive (SSD).

The client devices, e.g., the client device 130, can issue a data access request for accessing data. The data access request can be a read request or a write request. The client device 130 can implement any application service that provides data items to be stored in the data storage system 125 or consumes the data items stored in the data storage system 125.

The first data center 105 includes an application service 120 that facilitates reading data from and/or writing data to the data storage system 125. The first data center 105 includes a WAL system 135 that writes the data items provided by the client device 130 to a WAL 150. The WAL system 135 can also replicate the data items received from the client device 130 to other data centers, e.g., WALs of one or more data centers 110 and 115. The WAL system 135 can implement a consensus protocol, e.g., Paxos, Raft, a customized version of known protocols, or a user-defined consensus protocol, to replicate the data.

When the client device 130 issues a write request to write a data item 145, the WAL system 135 receives the write request, assigns a HLC timestamp to the data item 145 and returns the HLC timestamp to the client device 130, and writes the data item 145 to the WAL 150. As described above, a HLC is a logical clock which keeps close to physical time, which captures the causality relationship and ensures appropriate time ordering between multiple data writes even in the presence of clock skew.

After writing the data item 145 to the WAL 150, the WAL system 135 can replicate the data item to one or more data centers, e.g., second data center 110 and third data center 115. The WAL system 135 replicates the data item 145 using a consensus protocol, which obtains a consensus on the data item 145 from a majority of the datacenters in a quorum of the data centers to which the data item 145 is to be replicated. For example, the quorum can include three data centers to which the data item 145 is to be replicated and a majority of the quorum can be two of the three data centers. In some embodiments, obtaining a consensus includes obtaining a consensus on a value of the data item 145 from the majority of the data centers to ensure that the data item 145 being written is the latest version. In some embodiments, to ensure that the data item 145 is appropriately time ordered with other data writes from the same data center or a different datacenter, the WAL system 135 uses HLC-based consensus protocol to replicate the data item 145, which is described in further detail at least with reference to FIG. 2 below.

Figure 2:
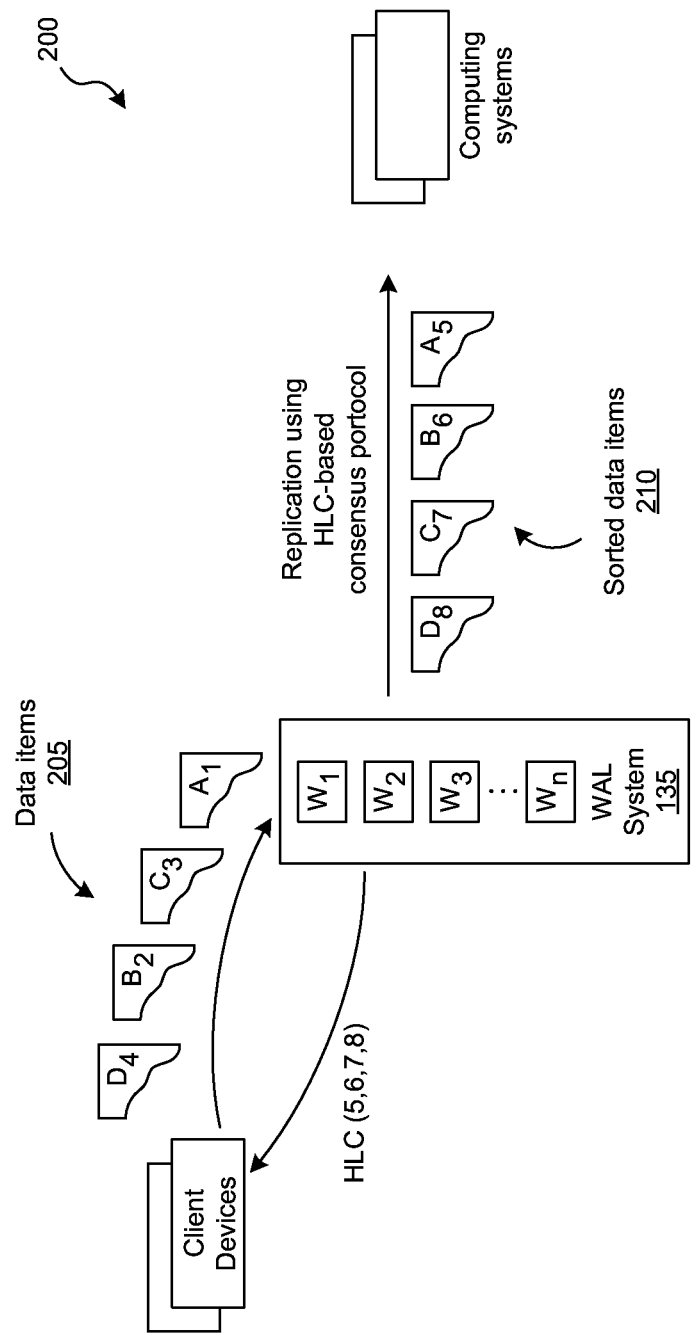
FIG. 2 is a block diagram illustrating data replication using hybrid logical clock (HLC)-based consensus protocol, consistent with various embodiments.

FIG. 2 is a block diagram illustrating data replication using HLC-based consensus protocol, consistent with various embodiments. Consider that the WAL system 135 receives multiple write requests from multiple client devices, including client device 130, to write data items 205, e.g., "A," "B," "C" and "D." Further, consider that A happened (was generated or written to the client device 130) before B, which happened before C, which happened before "D." Accordingly, the timestamp of the data items 205 should be $ts_1<ts_2<ts_3<ts_4$, where "$ts_1$" is the timestamp of data item "A," "$ts_2$" is the timestamp of data item "B," "$ts_3$" is the timestamp of data item "C," and "$ts_4$" is the timestamp of data item "D." However, due to the clock skew among the systems that generated the corresponding data items 205, the timestamps can be out of order or violate causal order. For example, the timestamps can be such that $ts_1<ts_3<ts_2<ts_4$, which indicates that data item C happened before data item B as shown in FIG. 2, which is not accurate. Accordingly, upon receiving the data items 205, the WAL system 135 assigns HLC timestamps, $ts_5$, $ts_6$, $ts_7$, and $ts_5$ to the data items 205, where "$ts_5$" is the HLC timestamp of data item "A," "$ts_6$" is the HLC timestamp of data item "B," "$ts_7$" is the HLC timestamp of data item "C," and "$ts_5$" is the HLC timestamp of data item "D." The WAL system 135 assigns the HLC timestamps $ts_5$, $ts_6$, $ts_7$, and $ts_5$ to the data items 205 such that $ts_5<ts_6<ts_7<ts_5$, which ensures appropriate time ordering between the data items 205.

The WAL system 135 can sort the data items 205 based on their HLC timestamps to generate sorted data items 210, and replicate the sorted data items 210 to other data centers. The consensus protocol uses the HLC timestamp rather than the actual or physical timestamp of the corresponding data item to obtain the consensus. For example, the WAL system 135 appends the HLC to the data item before replicating the data item. The consensus protocol executing at each of the data centers can examine the HLC timestamp before providing the consensus. By using the HLC timestamps, the WAL system 135 not only can replicate the data items in an appropriate order, it can also ensure that all the datacenters agree on the right value of the data item, e.g., the latest value of the data item, regardless of any clock skew associated with timestamps of any of the data items and thereby avoiding overwriting a new value of the data item with an old value of the data item. For example, consider that the first data center 105 is replicating a first data item associated with a user, e.g., a photo, which has a timestamp $ts_p$, to the second data center 110 and the third data center 115. Consider that the second data center 110 receives a second data item associated with the user, e.g., a comment associated with the photo, which has the timestamp $ts_c$ from a client device in a region associated with second data center 110. The comment is to be replicated to the first data center 105 and the third data center 115. Since a comment on a photo cannot be received without the photo, $ts_p<ts_c$. However, due to clock skew, consider that $ts_c<ts_p$. In the absence of the HLC timestamps, the consensus protocol replicates the data items, e.g., photo and the comment, such that the comment has an earlier timestamp than the photo at all the datacenters, which is inaccurate. However, with the implementation of HLC timestamps, the WAL system of the second data center (not illustrated) would know that a comment cannot be received at the second data center 110 without a photo, and assigns an HLC $ts_c$ to the comment upon receiving the comment at the second data center 110 such that HLC $ts_c$>HLC $ts_c$ (which is assigned by the WAL system 135 of the first data center 105), where "HLC $ts_c$" is the HLC timestamp of the comment and "HLC $ts_c$" is the HLC timestamp of the photo. The consensus protocol examines the HLC timestamps of the data items and ensures that the photo and the comment are replicated in an appropriate time order, that is, HLC $ts_c$<HLC $ts_c$ at all data centers.

Referring back to FIG. 1, after obtaining the consensus on the data item 145, the WAL system 135 commits the data item 145 to a read optimized store 140. In some embodiments, the read optimized store 140 is used to serve "read your write" requests. For example, consider that the client device 130 issues a read request for reading a data item that it has recently written to WAL 150. In some embodiments, the read request can be a snapshot read request or read atomic (RA) read request, e.g., the client device 130 can specify that a value of the data item to be returned is the value of the data item at a time indicated by a timestamp in the read request. The application service 120 receives the read request from the client device 130, extracts the timestamp from the read requests, and determines if the data item associated with the timestamp is stored in the data storage system 125. If the data item is stored in the data storage system 125, the application service 120 returns the data item to the client device 130. On the other hand, if the data item associated with the timestamp is not stored in the data storage system 125, which could be a case with a data item that is recently written and not yet committed to the data storage system 125, the application service 120 instructs the client device 130 to send the read request to the read optimized store 140, which can then serve the requested data item to the client device 130.

The read optimized store 140 can be implemented on one or more host machines having a data storage medium, e.g., hard drives, SSD, dynamic random access memory (DRAM). The read optimized store 140 stores data item that is most recently written to the WAL 150. In some embodiments, the criterion for the data items to be considered as most recently written can be user-defined, e.g., by an administrator associated with the first data center 105 or the application service 120. For example, most recently written data items can be a specified number of data items that are most recently written, data items that are written within a last specified period, etc. The read optimized store 140 is typically used to respond to read requests for data items that are not yet committed to the data storage system 125.

In some embodiments, the WAL system 135 publishes a write application programming interface (API) but not a read API to the client devices. Accordingly, the client device 130 can write to the WAL 150, e.g., using the write API, but may not read from the WAL 150. The read requests from the client devices are served using the data storage system 125 and/or the read optimized store 140. The read optimized store 140 publishes a read API but not a write API to the client devices. Accordingly, the client device 130 may read from the read optimized store 140 but not write to the read optimized store 140.

The WAL 150 is partitioned into multiple partitions, e.g., $W_1$-$W_m$. When the WAL system 135 writes the data item 145 to the WAL 150, the data item 145 is written into one of the multiple partitions. As described above, a data item is associated with a specified shard of the data storage system 125. However, regardless of the shard with which the data item is associated, the data item can be written to any of the multiple partitions. Partitioning the WAL 150 into multiple partitions and enabling the WAL system 135 to write data items associated with any shard at any of partitions of the WAL 150 provides scalability to data writes. In some embodiments, there is no one-to-one correspondence between the WAL partitions and the shards of the data storage system 125. The number of partitions in the WAL can be adjusted, e.g., increased or decreased, on demand, e.g., based on the rate at which writes are received at the WAL 150.

In some embodiments, at least some of the partitions of the WAL 150 are associated with different replication configurations, each directed to a different benefit. For example, in a first replication configuration a first partition, $W_1$, provides no replication. The first configuration provides the least latency among other replication configurations, e.g., the time required to write the data item is minimum as no consensus is required among multiple datacenters. In a second replication configuration, a second partition of the WAL 150, $W_2$, can be configured to replicate the data items written to the second partition to be replicated to at least a subset of the data centers, e.g., 3 out of 5 data centers, without requirement of any consistency. The second configuration can provide data availability since the data items are replicated to more than one data center. However, the second configuration may not provide any consistency. A third partition, $W_3$, can be configured to provide availability and consistency, e.g., replicate the data items to at least a subset of the data centers, e.g., 3 out of 5 data centers, and provide consistency by requiring a consensus among the subset of the data centers. Further, in the third configuration the latency of a data write may be higher compared to that of the first and second configuration since time is consumed for obtaining consensus.

The data items from the WAL 150 are committed to the data storage system 125 using a drain process, which is described in further detail at least with reference to FIG. 3 below.

In some embodiments, the second data center 110 and the third data center 115 are similar to the first data center 105. That is, the second data center 110 and the third data center 115, like the first data 105, include a WAL system, a data storage system, an application service and a read-optimized store. However, the number of shards in the data storage system and/or the partitions in the WAL can be same or different for different data centers.

Figure 3:
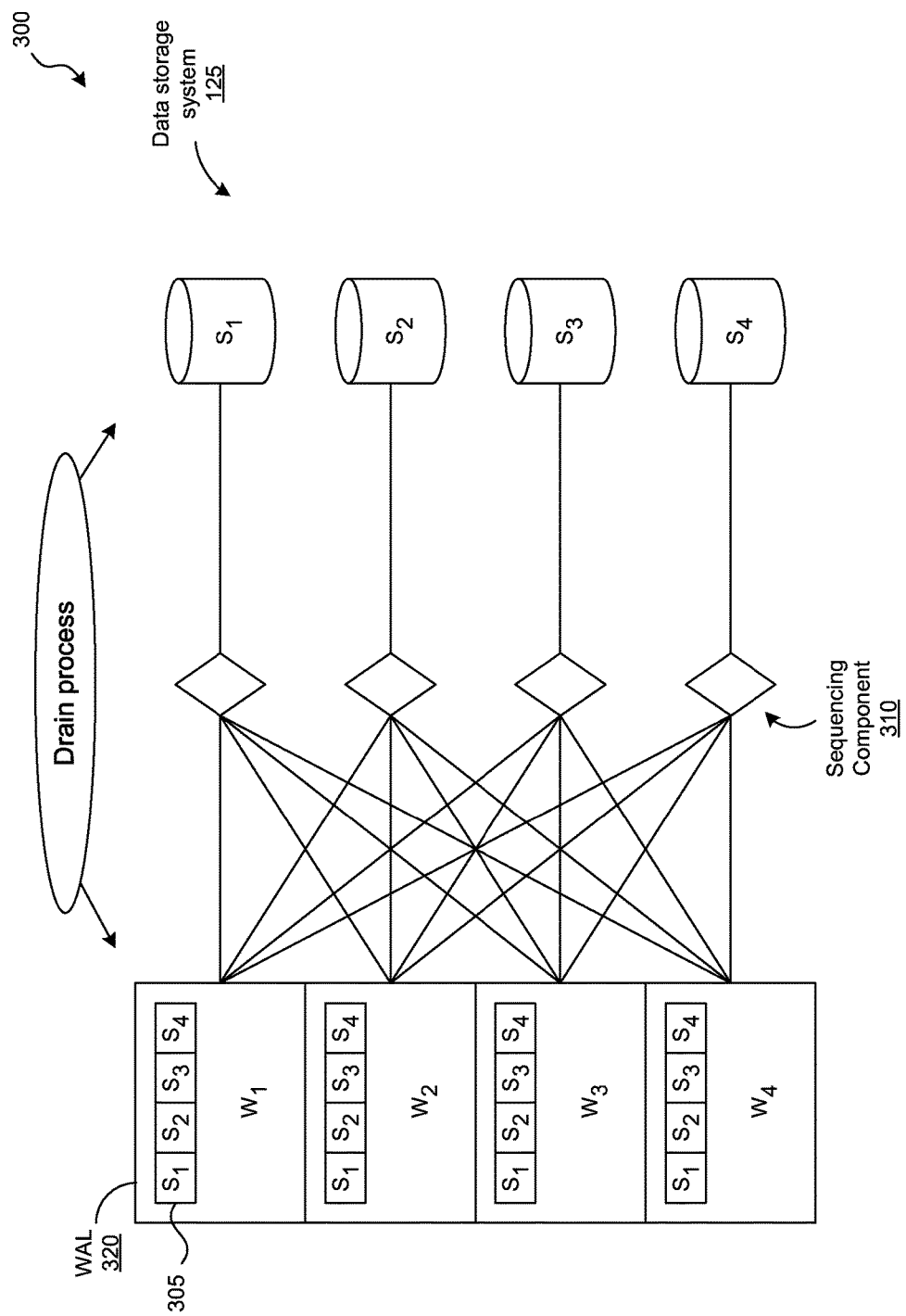
FIG. 3 is a block diagram of an example for draining data from a write-ahead log (WAL) in a data center to a data storage system of the data center, consistent with various embodiments.

FIG. 3 is a block diagram of an example 300 for draining data from a WAL in a data center to a data storage system of the data center, consistent with various embodiments. The drain process identifies new data items or updated data items in WAL 320 and commits them to the corresponding shards in the data storage system 125. In some embodiments, the WAL 320 is similar to the WAL 150 of FIG. 1. In some embodiments, the WAL system 135 maintains a bitmap 305 in each of the partitions in the WAL 320, which indicates the shards that have been updated, e.g., a new data item being added to a shard or an existing data item being updated or deleted from the shard. For example, if the data storage system 125 has "m" shards, then the bitmap 305 can have "m" bits, and a bit corresponding to the shard which has been updated can be set to a specified value, e.g., "1."

When the WAL system 135 executes the drain process, the drain process determines a list of shards that have been updated, e.g., by reading the bitmap 305 from each of the partitions in the WAL 320. For each of the updated shards, the WAL system 135 determines the partitions that stores the data items associated with the corresponding shard, obtains the data items from each of the determined partitions, and commits the obtained data items to the corresponding shard in the data storage system 125. In some embodiments, a sequencer module 310 of the WAL system 135 sequences or orders the data items based on their associated HLC timestamps before committing the data items to the corresponding shard.

In some embodiments, when the WAL system 135 identifies the shards that have been updated, the WAL system 135 identifies those shards that have been updated since the drain process was last executed. That is, after a drain process is executed successfully, the WAL system 135 can insert a checkpoint in the WAL partitions marking a point in time at which a state of the WAL partitions is committed to the data storage system 125. When a drain process is executed, the WAL system 135 identifies those shards that have been updated post the checkpoint inserted by the last executed drain process as the shards that need to be committed to the data storage system 125.

The drain process can be executed at regular time intervals, or based on any other trigger, e.g., a number of data items that is to be committed to the data storage system 125 exceeds a specified threshold, a size of the WAL 320 exceeds a specified threshold, or a user command.

Figure 4:
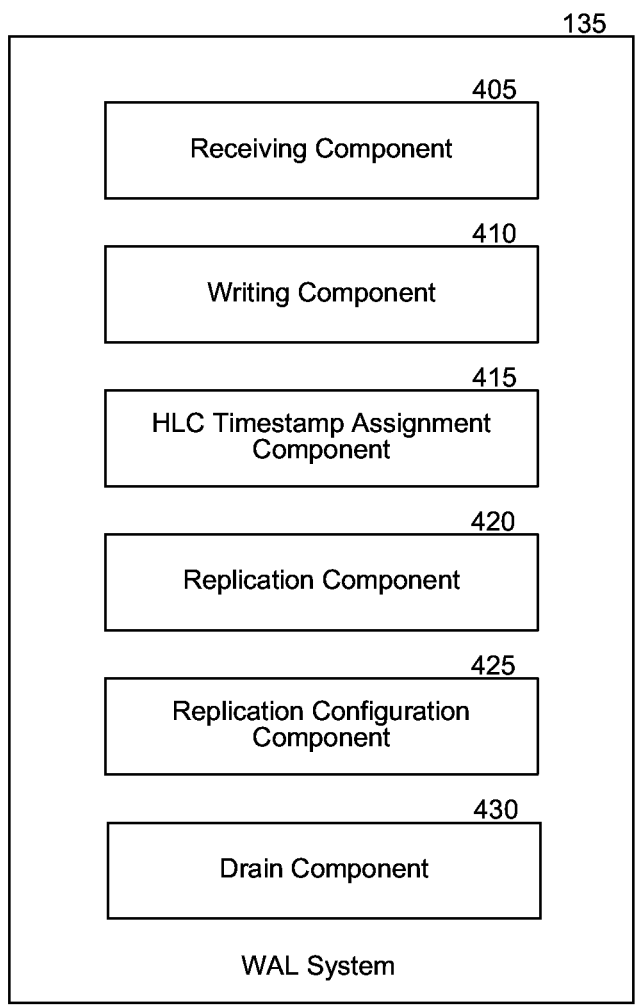
FIG. 4 is a block diagram of a WAL system of FIG. 1, consistent with various embodiments.

FIG. 4 is a block diagram of the WAL system 135 of FIG. 1, consistent with various embodiments. The WAL system 135 includes a receiving component 405 that receives a write request, e.g., from the client device 130, for writing a data item, e.g., data item 145, to the data storage system 125. The WAL system 135 includes a writing component 410 that writes the data item 145 to the WAL 150. The WAL system 135 includes a HLC timestamp assigning component 415 that assigns the HLC timestamp to the data item 145 upon writing the data item to the WAL 150. The WAL system 135 includes a replication component 420 that replicates the data item 145 from the WAL 150 to a WAL of one or more other data centers. In some embodiments, the replication component 420 replicates the data items using a HLC-based consensus protocol, e.g., as described above at least with reference to FIGS. 1 and 2. The WAL system 135 includes a WAL configuration component 425 that configures partitions of the WAL with various replication configurations, e.g., as described above at least with reference to FIG. 1. The WAL system 135 includes a drain component 430 that commits the data items from the WAL 150 to the corresponding shards of the data storage system 125, e.g., as described above at least with reference to FIG. 3.

Figure 5:
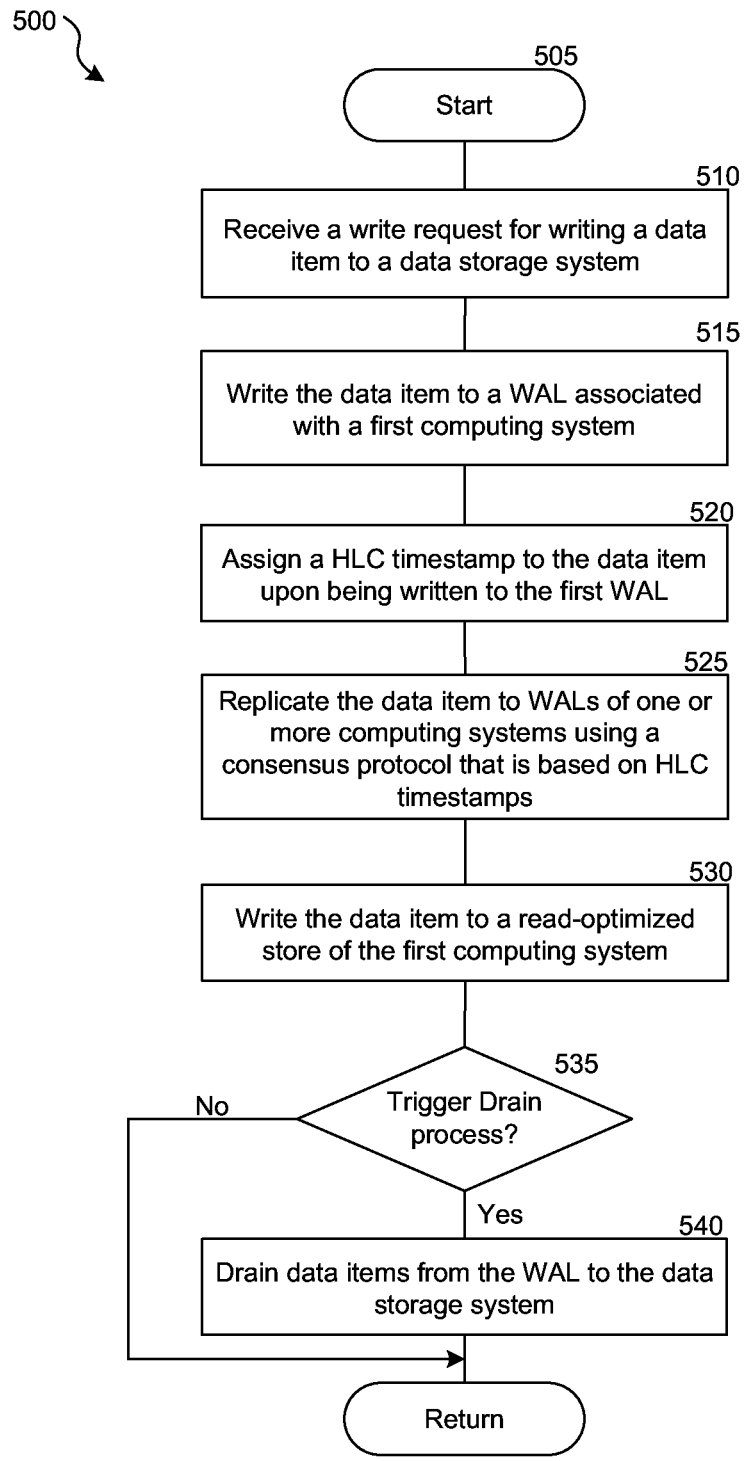
FIG. 5 is a flow diagram of a process for processing a data write request, consistent with various embodiments.

FIG. 5 is a flow diagram of a process 500 for processing a data write request, consistent with various embodiments. The process 500 may be executed in the environment 100 of FIG. 1. The process 500 begins at block 505, and at block 510, the receiving component 405 receives a write request from a client device, e.g., the client device 130, for writing a data item, e.g., the data item 145, to the data storage system 125 of the first data center 105. The data item 145 can be generated by the client device 130 or received at the client device 130 from another entity, e.g., a user or an application service that consumes the data stored in the shards.

At block 515, the writing component 410 writes the data item 145 to the WAL 150 of the first data center 105. In some embodiments, the writing component 410 writes the data item 145 to one of the multiple partitions of the WAL 150.

At block 520, the HLC timestamp assigning component 415 assigns a HLC timestamp to the data item 145, e.g., as described at least with reference to FIGS. 1 and 2. As described above at least with reference to FIGS. 1 and 2, in some embodiments, the HLC timestamps are assigned to data items to compensate for any clock skew among the systems that generate the data items. The HLC timestamp assigning component 415 returns the HLC timestamp of the data item 145 to the client device 130.

At block 525, the replication component 420 replicates the data item 145 to one or more data centers. In some embodiments, the replication component 420 replicates the data item 145 using a HLC-based consensus protocol. As described above at least with reference to FIGS. 1 and 2, in the HLC-based consensus protocol, the consensus protocol considers the HLC timestamp of the data item rather than the physical timestamp in obtaining the consensus from the involved data centers.

At block 530, after obtaining the consensus, the writing component 410 commits the data item 145 to the read optimized store 140. In some embodiments, the read optimized store 140 is used to serve read requests for data items that have written to the WAL 150 most recently.

At determination block 535, the drain component 430 determines whether to a trigger to execution the drain process is received. In some embodiments, the drain process is executed based on a trigger, e.g., expiry of a specified time interval, a number of data items that is to be committed to the data storage system 125 exceeds a specified threshold, a size of the WAL 320 exceeds a specified threshold, or a user command.

If the trigger is not received, the process 500 returns. On the other hand, if the trigger is received, at block 540, the drain component 430 executes the drain process to commit the data items from the WAL 150 to the data storage system 125. Additional details with respect to the drain process are described at least with reference to FIG. 6 below.

Figure 6:
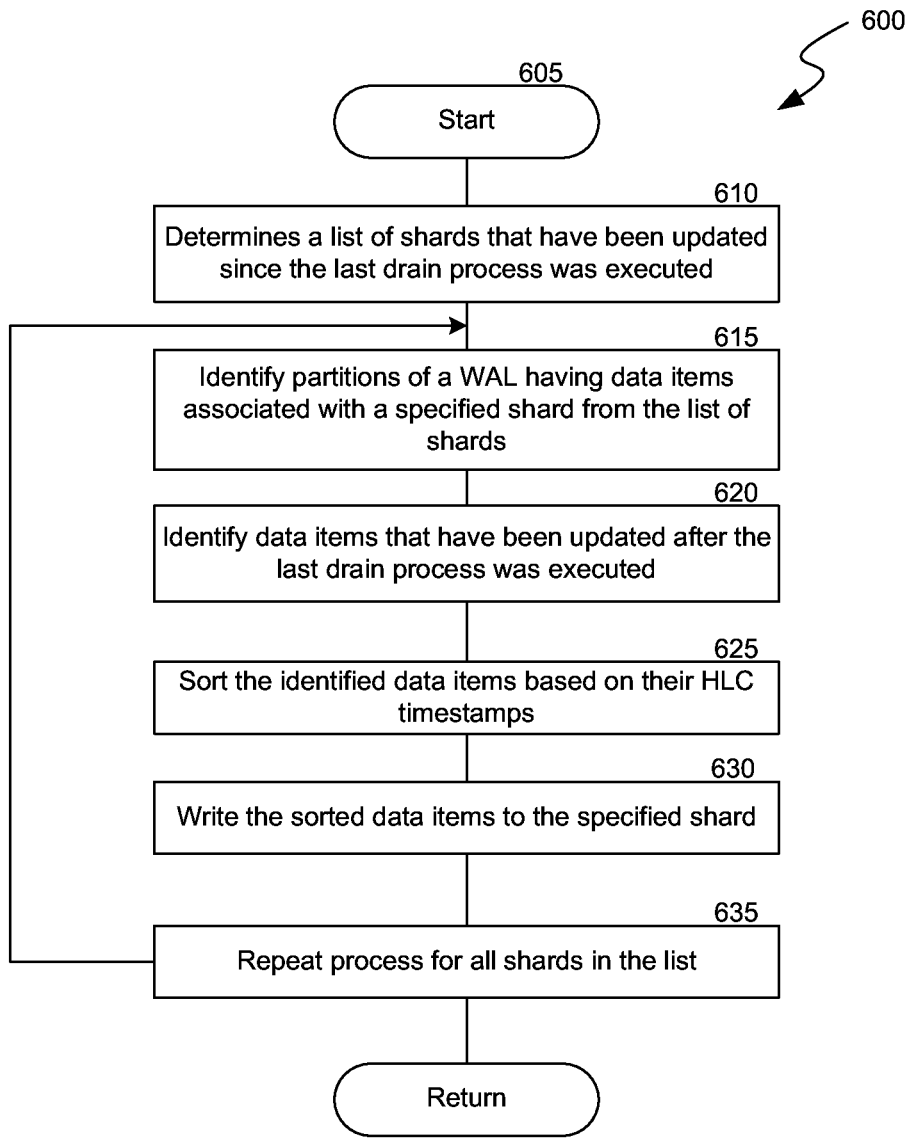
FIG. 6 is a flow diagram of a process for draining data from a WAL of the data center to the data storage system, consistent with various embodiments.

FIG. 6 is a flow diagram of a process 600 for draining data from a WAL of the data center to the data storage system, consistent with various embodiments. The process 600 may be executed in the environment 100 of FIG. 1. The process 600 begins at block 605, and at block 610, the drain component 430 determines a list of shards that have been updated since the last drain process was executed. In some embodiments, the drain component 430 uses the bitmap associated with each of the WAL partitions to determine the shards that have been updated since the last drain process was executed. If a data item associated with a specified shard has been updated, e.g., modified, added, or deleted, in a specified partition after the execution of the last drain process, then a bit corresponding to the specified shard in the bitmap of the specified partition is set, e.g., to "1."

At block 615, the drain component 430 identifies a list of partitions of the WAL 150 that has data items associated with a specified shard from the list of shards.

At block 620, the drain component 430 identifies the data items associated with the specified shard that have been updated after the last drain process was executed.

At block 625, the drain component 430 sorts the identified data items based on their corresponding HLC timestamps.

At block 630, the drain component 430 commits the sorted data items to the specified shard in the data storage system 125.

At block 635, the drain component repeats the process of at least blocks 615-630 for all shards in the list of shards.

Figure 7:
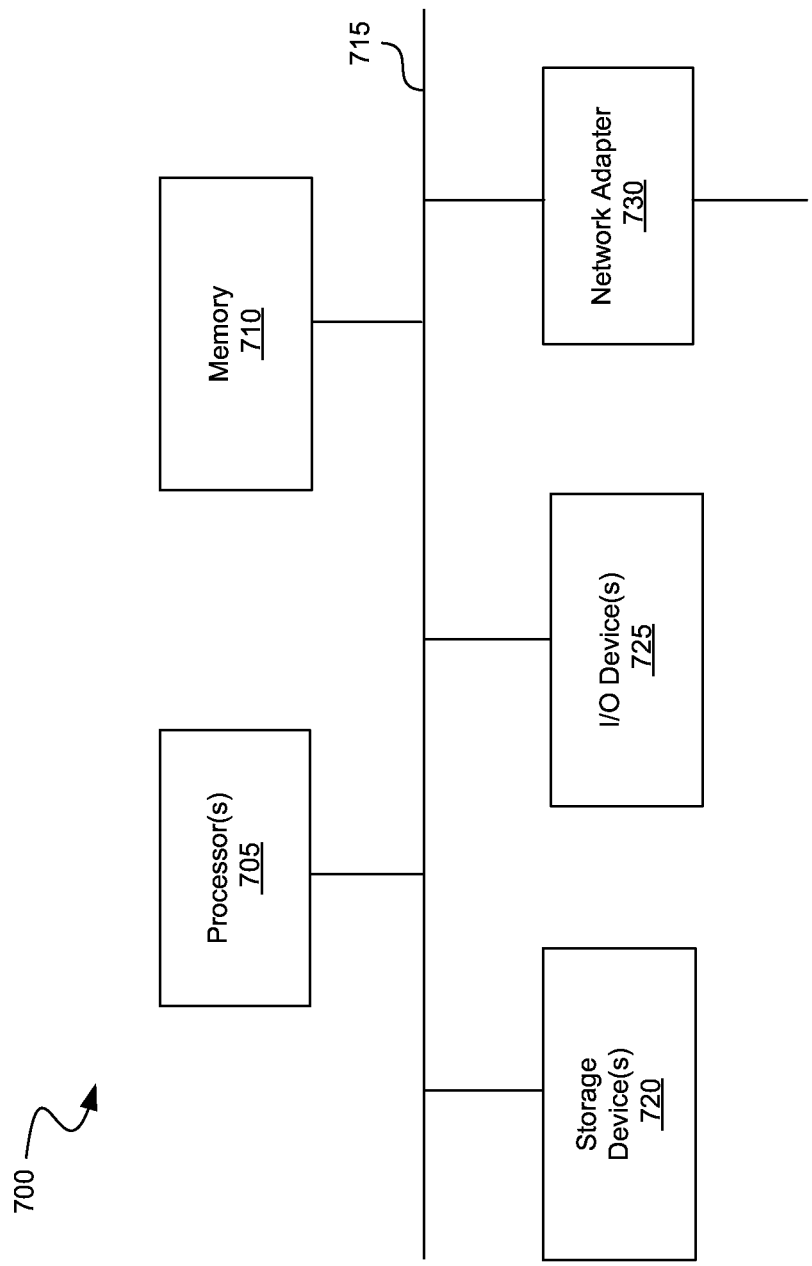
FIG. 7 is a block diagram of a computer system as may be used to implement features of the disclosed embodiments.

FIG. 7 is a block diagram of a computer system as may be used to implement features of the disclosed embodiments. The computing system 700 may be used to implement any of the entities, components, modules, systems, or services depicted in the examples of the foregoing figures (and any other entities described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C)

bus, or an Institute of Electrical and Electronics Engineers (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media).

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
   receiving, at a first computing system and from a client device, a write request for writing a data item to a data storage system, wherein the first computing system is one of multiple computing systems in a distributed computing system;
   writing, by the first computing system, the data item to a first write-ahead log (WAL) in the first computing system;
   assigning, by the first computing system, a hybrid logical clock (HLC) timestamp to the data item upon being written to the first WAL, wherein the HLC timestamp is generated based on a HLC of the distributed computing system; and
   replicating, by the first computing system, the data item to WALs of one or more of the multiple computing systems based on a consensus protocol, wherein the replicating includes:
     appending the HLC timestamp to the data item,
     executing the consensus protocol based on the HLC timestamp to obtain a consensus for writing the data item to the data storage system, wherein the consensus protocol ensures that the data item to be written to the data storage system is a latest version of the data item based on the HLC timestamp, and
     writing the data item to the WALs of one or more of the multiple computing systems upon receiving a consensus.

2. The computer-implemented method of claim 1 further comprising:
   writing, by the first WAL and upon receiving the consensus, the data item to a read-optimized store of the first computing system.

3. The computer-implemented method of claim 2, wherein writing to the read-optimized store includes storing, at the read-optimized store, those data items that are written to the first WAL in a most recent time period.

4. The computer-implemented method of claim 2, wherein the read-optimized store publishes a read-only application programming interface (API) to the client device using which the client device can read data from but not write data to, and wherein the first WAL publishes a write-only API using which the client device can write data to but cannot read data from.

5. The computer-implemented method of claim 1 further comprising:
  receiving, at the first computing system and from the client device, a read request for reading the data item, the read request including a timestamp of the data item indicating a time at which the data item was written to the first WAL;
  determining, by the first computing system, that the data storage system does not have the data item associated with the timestamp;
  redirecting, by the first computing system, the read request to a read-optimized store of the first computing system; and
  returning, by the read-optimized store, the data item associated with the timestamp to the client device.

6. The computer-implemented method of claim 1, wherein assigning the HLC timestamp to the data item includes enabling two write requests for the data item that are causally ordered to be sorted in a time based order regardless of a clock skew associated with entities that issued the two write requests.

7. The computer-implemented method of claim 1 further comprising:
  executing a drain process to write multiple data items from the first WAL to the data storage system.

8. The computer-implemented method of claim 7, wherein executing the drain process includes writing data items to one or more of multiple shards of the data storage system, wherein a shard of the multiple shards stores a subset of data items in the distributed computing system.

9. The computer-implemented method of claim 7, wherein executing the drain process includes:
  reading, from one or more of multiple partitions of the first WAL, data items associated with a specified shard of multiple shards of the data storage system,
  sorting, based on HLC timestamps, the data items associated with the specified shard to generate a sorted set of data items, and
  writing the sorted set of data items to the specified shard.

10. The computer-implemented method of claim 9, wherein reading the data items associated with the specified shard includes determining the partitions having data items associated with those shards for which updates have been received since the drain process was last executed.

11. The computer-implemented method of claim 9, wherein reading the data items associated with the specified shard includes maintaining a bitmap for each of the partitions, the bitmap indicating a set of shards for which updates have been received in the corresponding partition since the drain process was last executed.

12. The computer-implemented method of claim 7, wherein executing the drain process includes executing the drain process in response to a trigger, the trigger being at least one of an expiry of a time interval or an amount of data items to be drained exceeds a specified threshold.

13. The computer-implemented method of claim 7, wherein executing the drain process includes ensuring that a timestamp associated with the data item being written to the first WAL is greater than the timestamp of the data item stored in the data storage system.

14. The computer-implemented method of claim 1, wherein writing the data item to the first WAL includes writing the data item to one of multiple partitions of the first WAL, wherein the client device writes a specified data item associated with any of multiple shards of the data storage system to any of the multiple partitions.

15. The computer-implemented method of claim 14, wherein multiple writes within a partition of the partitions are sorted based on the consensus protocol.

16. The computer-implemented method of claim 14, wherein at least some of the multiple partitions are associated with different replication properties, and wherein the multiple partitions includes:
  a first partition that stores data items that are not replicated to other computing systems,
  a second partition that stores data items that are replicated to a subset of the computing systems, and
  a third partition that stores data items that are replicated to at least a subset of the computing systems without executing the consensus protocol.

17. The computer-implemented method of claim 1 further comprising:
  transmitting, by any WAL system of the multiple computing systems and to a data consuming system, multiple data items from a WAL of the corresponding WAL system sorted based on HLC timestamps of the multiple data items.

18. A non-transitory computer-readable storage medium storing computer-readable instructions, comprising:
  instructions for receiving, at a first computing system and from a client device, a write request for writing a data item to a data storage system, wherein the data storage system includes multiple shards in which each of the shards stores a subset of data items in a distributed computing system, wherein the data item is associated with a specified shard of the multiple shards;
  instructions for selecting, by the first computing system, a first partition of multiple partitions of a first write-ahead log (WAL) in the first computing system to write the data item into, wherein the selecting is done based on a replication property specified in the write request;
  instructions for writing, by the first computing system, the data item to the first partition of the first WAL;
  instructions for replicating the data item to one or more computing systems in the distributed computing system based on a replication property associated with the first partition; and
  instructions for draining, in response to a drain trigger, multiple data items in the first WAL to the data storage system.

19. The non-transitory computer-readable storage medium of claim 18, wherein the instructions for draining the multiple data items access include:
  instructions for determining that writing a specified data item of the multiple data items to the data storage system include writing different portions of the specified data item to different shards, and
  instructions for writing the different portions of the specified data item to corresponding shards.

20. A system, comprising:
  a processor;
  a first component configured to receive a write request for writing a data item to a data storage system, wherein the data storage system includes multiple shards in which each of the shards stores a subset of data items in a distributed computing system, wherein the data item is associated with a specified shard of the multiple shards;
a second component configured to:
   select a first partition of multiple partitions of a first write-ahead log (WAL) to write the data item into, wherein the first partition is selected based on a replication property specified in the write request, and
   write the data item to the first partition of the first WAL;
a third component configured to replicate the data item to one or more computing systems in the distributed computing system based on a replication property associated with the first partition; and
a fourth component configured to drain multiple data items in the first WAL to the data storage system.

* * * * *